United States Patent [19]
Miller et al.

[11] Patent Number: 5,471,348
[45] Date of Patent: Nov. 28, 1995

[54] DIRECTED REFLECTION OPTICAL DEVICE

[75] Inventors: Richard A. Miller, Stillwater; Kenneth A. Aho, Chisago City; John F. Dreyer, Jr., North Oaks, all of Minn.

[73] Assignee: Minnesota Mining and Manufacturing Company, St. Paul, Minn.

[21] Appl. No.: 242,264

[22] Filed: May 13, 1994

[51] Int. Cl.$^6$ .................... G02B 5/12; G02B 5/04
[52] U.S. Cl. .................. 359/837; 359/834; 359/514; 359/527; 362/331
[58] Field of Search .................. 359/837, 834, 359/514, 527; 362/331

[56] References Cited

U.S. PATENT DOCUMENTS

| | | | |
|---|---|---|---|
| 3,814,500 | 6/1974 | Ebenbichler | 359/514 |
| 4,252,409 | 2/1981 | Schwab | 359/527 |
| 4,327,968 | 5/1982 | Yevick | 359/834 |
| 4,799,137 | 1/1989 | Aho | 359/834 |
| 4,874,228 | 10/1989 | Aho et al. | 359/49 |
| 4,930,867 | 1/1990 | Negishi | 359/834 |
| 5,190,370 | 3/1993 | Miller et al. | 370/362 |

*Primary Examiner*—Paul M. Dzierzynski
*Assistant Examiner*—Mohammad Y. Sikder
*Attorney, Agent, or Firm*—Gary L. Griswold; Walter N. Kirn; Stephen W. Buckingham

[57] ABSTRACT

An optical device having a transparent body and including two prism surfaces formed thereon. The composite structure exhibits two axis stability in that the angular relationship between the input beam and the output beam remains fixed for slight movement of the device about two orthogonal axes.

12 Claims, 2 Drawing Sheets

5,471,348

DIRECTED REFLECTION OPTICAL DEVICE

FIELD OF THE INVENTION

The present invention is an optical device for redirecting incident light. More particularly, the invention relates to a structured optical sheet which redirects incident light through a fixed angle. This property is independent of the orientation of the plane of the sheet over a range.

BACKGROUND

Reflective structured optical sheets such as that taught by U.S. Pat. No. 4,799,137 can be used to intercept and redirect incident light. In this reference the incident light is redirected through a design angle (ninety degrees) by refractive optical elements in combination with a reflective mirror coating. This is one example of a directed reflection optical device. The inclusion of a mirror in the composite structure requires vapor coating a metallic layer on the transparent plastic film or body portion of the device. Such metallic layers are optically inefficient, expensive to apply and can preferentially suffer environmental degradation.

This type of device exhibits what may be called "single axis stability". The input light beam and the output bear a fixed angular relationship even when the device is rotated slightly about one axis. This property can be exploited in some applications.

SUMMARY

The present invention includes two optically structured surfaces formed on opposite sides of a transparent body. This device exhibits what may be called "two axis stability". In operation, entry rays which approach the first or "upper" surface at a high angle of incidence are refracted into the body of the device by an array of prisms formed on the upper surface. These "captured" rays are directed by total internal reflection to the second or "lower" surface of the transparent material. The lower structured surface also includes an array of prisms which return the captured rays to the first or upper surface where they are again refracted toward the direction which is perpendicular to the "initial" entrance ray. The two structured surfaces cooperate, capture and redirect a angle incident beam of light and redirect it through an angle, which in the illustrative example is ninety degrees. This process is to some degree, independent of the orientation of the optical device around two of three axes within limits. Thus the device exhibits "two axis stability ".

BRIEF DESCRIPTION OF THE DRAWINGS

The drawings show an illustrative example of the invention and throughout the figures identical reference numerals refer to identical structural elements, wherein.

DETAILED DESCRIPTION

Figure 1:
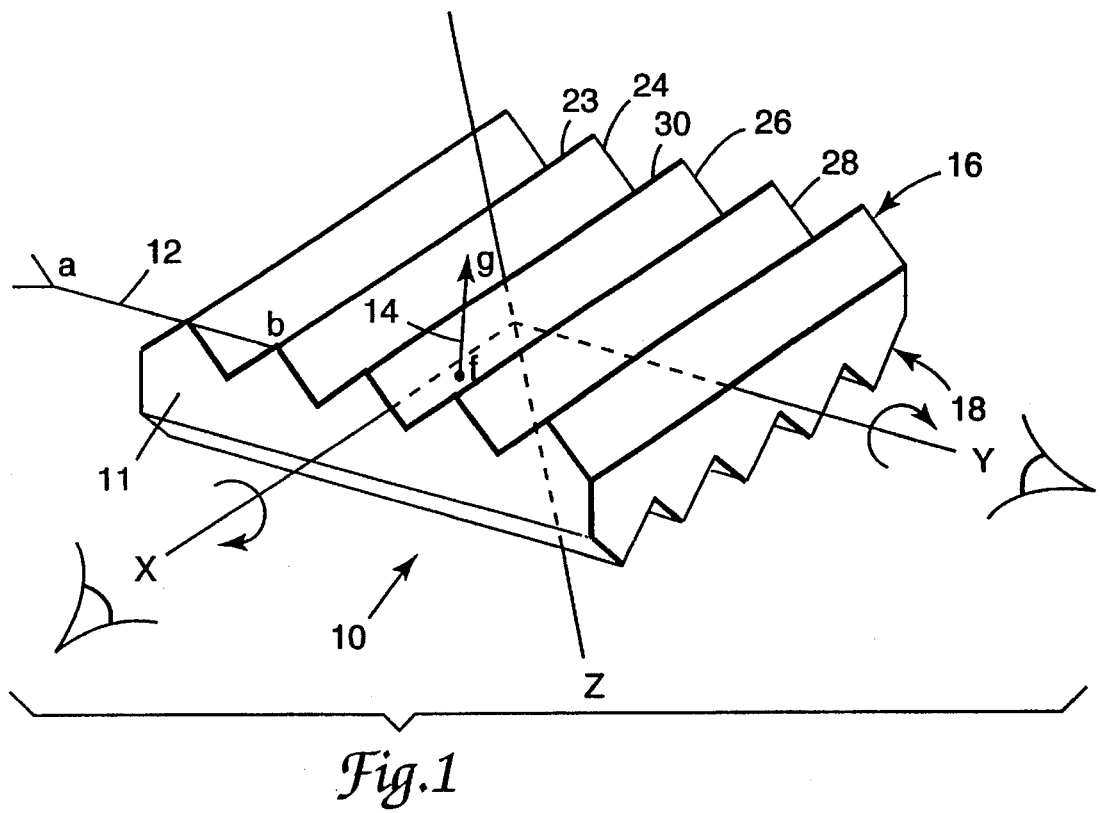
FIG. 1 is a perspective view of the invention in its planar configuration.

The traditional corner cube reflector is referred to as retro-reflective because the reflected ray travels back along the same path as the incident ray. This property is preserved even when the corner cube is rotated within limits about all three axes. Thus the corner cube may be referred to as having "three axis stability". The corner cube should be compared with a plane mirror wherein the angle of incidence equals the angle of reflection. For this optical device the reflected ray follows the incident ray only when the angle is zero. In this narrow case the plane mirror is retro-reflective and since this property is preserved when the mirror is rotated about this single axis formed by the retro-reflected ray it may be said to have "single axis stability". The present invention described in detail below possesses two axis stability about the X and Y axis as seen in FIG. 1. In this sense it lies between the plane mirror and the corner cube device.

FIG. 1 is a perspective view of the optical device 10 in its planar configuration. In general, the body 11 is formed of transparent material and has a structured upper surface 16 and a structured lower surface 18. The upper surface 16 is an array of linear prisms typified by prisms 24, 26 and 28. In operation, the central entrance ray 12 segment (ab) enters prism 24 on the first facet 23 of the prism 24 where it enters the body 11. Ultimately central exit ray 14 segment (fg) emerges from facet 30 of prism 26.

The vertical plane containing exit ray 14 is parallel to, but displaced from the vertical plane containing exit ray 12. In FIG. 1 the exit ray 14 will exit from the adjacent prism 26 as seen in the diagram. If the body thickness is increased sufficiently in the Z-direction, the exit ray will exit from the "next" or second adjacent prism 28. There is a necessary relationship between the geometry of the prisms and the thickness T of the body 11 which controls which prism delivers the exit ray. In general the efficiency of the optical device 10 is maximized by selecting a thickness which causes the exit ray to emerge from the adjacent prism 26.

Figure 2:
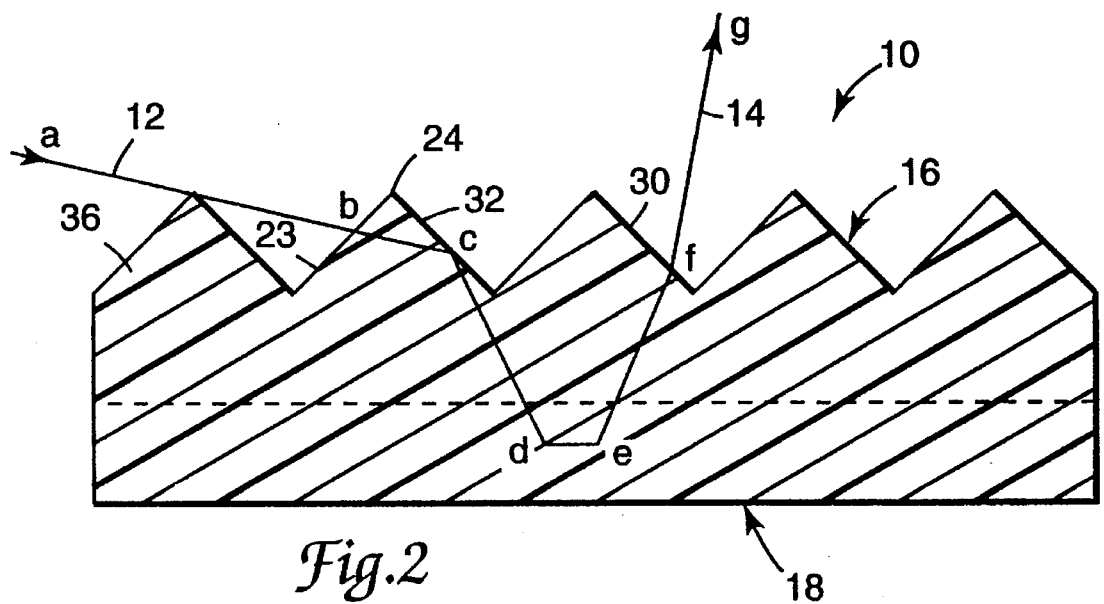
FIG. 2 is a cross-section view of the invention.

FIG. 2 is a cross-section view of the optical device 10 cut along the Y axis. In this view a representative entrance ray 12 segment (ab) just grazes the peak of prism 36. This entrance ray 12 segment (ab) is refracted at the surface 23 of prism 24 at point (b) and ray segment (bc) undergoes total internal reflection at point (c) on the second surface 32 of prism 24. The ray (cd) then passes through the body 11 of the optical device 10 and is directed toward the linear prisms of the lower surface 18 where it is reflected as discussed in connection with FIG. 3.

For most common optical plastic materials having an index of refraction of between 1.45 to 1.6, and regular right prisms, the included acceptance angle for the optical device will equal approximately 13 degrees.

Figure 3:
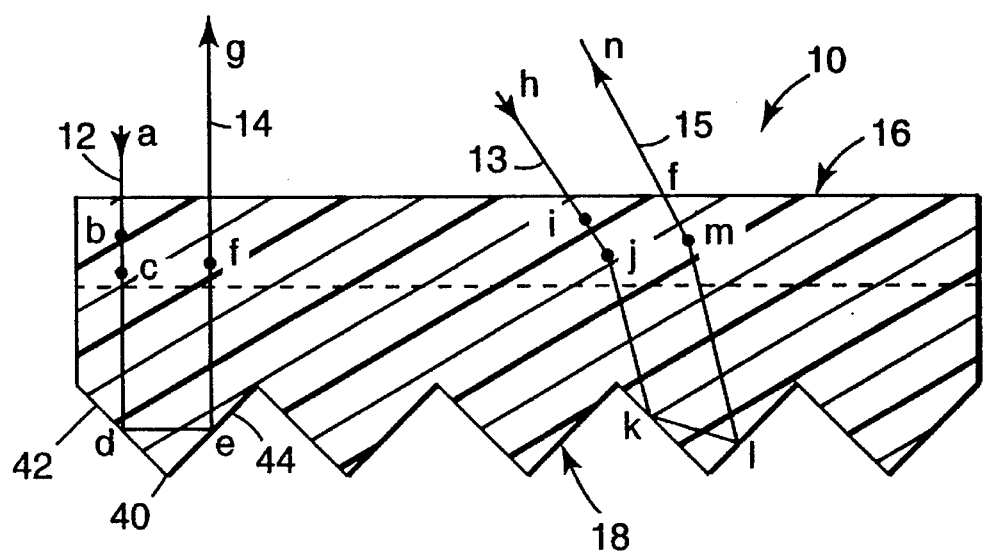
FIG. 3 is a cross-section view of the invention.

FIG. 3 is a cross-section view of the optical device 10 cut along the X axis. This view best illustrates reflection of ray segment (cd) the at the lower surface 18. The lower surface 18 includes an array of prisms including prism 40. The internal ray segment (cd) undergoes total internal reflection at point (d) on the first surface 42 of prism 40 and is directed through an angle of ninety degrees in the X-Z plane, directing it toward the second surface 44 of the prism 40. The second surface 44 of the prism 40 also reflects the ray (de) at point (e) through an angle of 90 degrees in the Y-Z plane, and returns it toward the upper surface 16. Entrance ray 13 and exit ray 15 illustrate one axis of stability for the optical device 10 and they may considered as though the device 10 was rotated slightly about the X axis as set forth in FIG. 1. In this illustration the segment (jk) is reflected and directed to point (l). Total internal reflection at (l) results in segment (jk) being parallel to segment (lm). However the difference in optical path between segments (hi) and (mn) result in ray 13 not being quite parallel to ray 15. However in contrast to a mirror lower surface the rays tend in the same direction.

The preceding description has described how an entrance ray enters a first prism and is turned through an angle of ninety degrees to form a displaced exit ray which leaves the optical device through a "different" prism. In this exemplary embodiment (example 1) the prism pitch for the upper surface P1 and the lower surface P2 is the same. That is, the distance between the peaks of the prisms, for both the upper surface and the lower surface are identical. In the exemplary embodiment (example 1) the prisms of the upper and lower surface have identical geometry and are regular fight prisms where the first and second facets meet at an apex angle which is a right angle. Also in the exemplary embodiment, the prisms of the upper surface are orthogonal to the prisms of the lower surface. In tabular form the FIG. 1 structure is set forth as follows:

EXAMPLE 1 optical structure thickness T=0.021 upper surface (16) pitch (P1) P1=P2=0.014 upper surface prisms (36,26) are regular right prisms lower surface (18) pitch (P2) P2=P1=0.014 lower surface prisms (40) are regular right prisms

P1 grooves are ninety degrees to P2 grooves

Several variants of the invention are possible as well. For example the pitch P2 of the lower surface can be smaller than the pitch P1 of the upper surface, and the thickness T of the optical device 10 can be varied as well. It is also possible to vary the prism angle of the upper surface to produce a structure which directs the exit ray to angles of less than ninety degrees or greater than ninety degrees. For example included angle of between 80 and 110 degrees may prove useful.

Figure 4:
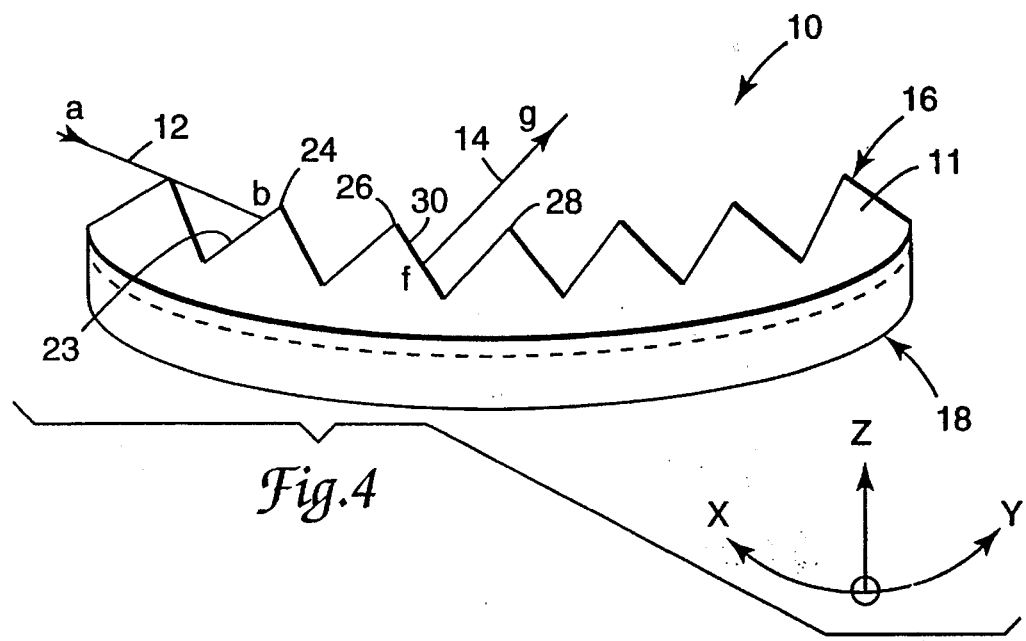
FIG. 4 is a perspective view of the invention in an arced configuration.

Although the present invention has thus far been described and shown in a planar configuration, it shall be understood that the device could also be formed and used in a curved or arced configuration such as that shown in FIG. 4. FIG. 4 shows the present device 10 curved along the Y axis in the positive Z direction. The device could also be curved along Y axis in the negative Z direction, or along X axis in the positive or negative Z direction. Compound curves could also be implemented. The device in any curved configuration maintains two axis stability about both the X and Y axis in the same manner as the planar configuration shown in FIGS. 1–3.

The operation of the curved configuration shown in FIG. 4 is in all respects the same as that described above with respect to the planar configuration shown in FIGS. 1–3. Entrance ray 12 segment (ab) enters prism 24 on its first facet 23 where it enters the body 11. Ultimately exit ray 14 segment (fg) emerges from facet 30 of prism 26 in the same manner as described above with respect to the planar configuration shown in FIGS. 1–3.

Although specific examples of the inventive structure have been described it is apparent that many modifications to the structure are possible without departing from the scope of the invention.

What is claimed is:

1. A reflective article comprising first and second structured surfaces, wherein:

said first structured surface includes a first array of prisms aligned in a first orientation;

said second structured surface includes a second array of prisms aligned in a second orientation, wherein the second orientation is different from said first orientation;

such that a light ray incident on said first structured surface at an entrance angle is reflected at said second structured surface and exits from said first structured surface at an exit angle, the exit angle measured relative to said entrance angle.

2. The reflective article of claim 1, wherein each prism in said first array of prisms includes a first facet and a second facet which intersect at a prism apex to define an apex angle.

3. The reflective article of claim 2, wherein the apex angle of at least one of said prisms in said first array of prisms measures approximately 90 degrees.

4. The reflective article of claim 2, wherein the apex angle of at least one of said prisms in said first array of prisms measures between 80 and 110 degrees.

5. The reflective article of claim 1, wherein each prism in said second array of prisms includes a first facet and a second facet which intersect at the prism apex to define an apex angle.

6. The reflective article of claim 5, wherein the apex angle of at least one of said prisms in said second array of prisms measures approximately 90 degrees.

7. The reflective article of claim 5, wherein the apex angle of at least one of said prisms in said second array of prisms measures between 80 and 110 degrees.

8. The reflective article of claim 1, wherein said first orientation is approximately orthogonal to said second orientation.

9. The reflective article of claim 1, wherein said entrance angle measures between 0 degrees and 13 degrees.

10. The reflective article of claim 1, wherein said exit angle is approximately 90 degrees.

11. The reflective article of claim 1 wherein a light ray incident on a first prism of said first structured surface at said entrance angle is reflected at said second structured surface and exits from a second prism of said first structured surface at said exit angle.

12. The reflective article of claim 11, wherein said exit angle is approximately 90 degrees.

\* \* \* \* \*

UNITED STATES PATENT AND TRADEMARK OFFICE
CERTIFICATE OF CORRECTION

PATENT NO.: 5,471,348

DATED: November 28, 1995

INVENTOR(S): Miller et al.

It is certified that error appears in the above-identified patent and that said Letters Patent is hereby corrected as shown below:

Col. 1, line 67, Delete "comer" and insert --corner--;
Col. 2, line 1, Delete "comer" and insert --corner--;
Col. 2, line 2, Delete "comer" and insert --corner--; and
Col. 3, line 10, Delete "fight" and insert --right--

Signed and Sealed this

Twenty-third Day of July, 1996

Attest:

BRUCE LEHMAN

Attesting Officer    Commissioner of Patents and Trademarks